US012467957B2

United States Patent
Millet et al.

(10) Patent No.: US 12,467,957 B2
(45) Date of Patent: Nov. 11, 2025

(54) FLUXGATE CURRENT TRANSDUCER

(71) Applicant: LEM International SA, Meyrin (CH)

(72) Inventors: Fabien Millet, Bons-en-chablais (FR);
Stéphan Trombert, Leschaux (FR)

(73) Assignee: LEM International SA, Meyrin (CH)

(*) Notice: Subject to any disclaimer, the term of this patent is extended or adjusted under 35 U.S.C. 154(b) by 193 days.

(21) Appl. No.: 18/283,153

(22) PCT Filed: Mar. 15, 2022

(86) PCT No.: PCT/EP2022/056763
§ 371 (c)(1),
(2) Date: Sep. 20, 2023

(87) PCT Pub. No.: WO2022/200135
PCT Pub. Date: Sep. 29, 2022

(65) Prior Publication Data
US 2024/0175903 A1     May 30, 2024

(30) Foreign Application Priority Data
Mar. 22, 2021   (EP) .................................... 21164001

(51) Int. Cl.
*G01R 15/18*     (2006.01)
*G01R 19/25*     (2006.01)

(52) U.S. Cl.
CPC .......... *G01R 15/185* (2013.01); *G01R 19/25* (2013.01)

(58) Field of Classification Search
CPC ...... G01R 15/185; G01R 19/25; G01R 19/20; G01R 33/0017; G01R 33/0041;
(Continued)

(56) References Cited

U.S. PATENT DOCUMENTS 9,714,987 B2 *   7/2017   Kashmiri ........... G01R 33/0041
2007/0087776 A1  4/2007   Terada
(Continued)

FOREIGN PATENT DOCUMENTS

JP    H02231951      9/1990
JP    2007088618     4/2007
(Continued)

OTHER PUBLICATIONS

Lattice Semiconductor, Mar. 2010, Leveraging FPGA and CPLD Digital Logic To Implement Analog To Digital Converters; 9 pages.
(Continued)

*Primary Examiner* — Akm Zakaria
(74) *Attorney, Agent, or Firm* — Faegre Drinker Biddle & Reath LLP

(57) ABSTRACT

Fluxgate current transducer including a control circuit and a fluxgate measuring device comprising a fluxgate magnetic field detector, the fluxgate magnetic field detector comprising a saturable soft magnetic core surrounded by an excitation coil, the control circuit comprising an excitation coil drive circuit connected to the excitation coil and a controller connected to the excitation coil drive circuit configured to generate an alternating excitation current $I_{fx}$ to alternatingly saturate the soft magnetic core. The controller is in the form of a FPGA (Field Programmable Gate Array) comprising at least one input comprising a 1 bit sigma delta analog-to-digital converter (ADC) connected to the excitation coil to receive a measurement signal output by the excitation coil.

8 Claims, 4 Drawing Sheets

(58) Field of Classification Search
CPC ...... G01R 33/04; H03M 3/494; H03M 3/502; H03M 3/43; H03M 3/458
See application file for complete search history.

(56) References Cited

U.S. PATENT DOCUMENTS

2014/0184214 A1* 7/2014 Schaffer ............... G01R 33/04
   324/253
2015/0276816 A1   10/2015 Yoshida
2019/0252976 A1*  8/2019 Chun ................... H03M 3/462

FOREIGN PATENT DOCUMENTS

| | | |
|---|---|---|
| JP | 2015201744 | 11/2015 |
| JP | 2017521675 | 8/2017 |
| WO | 2014/080609 | 5/2014 |
| WO | 2016/016038 | 2/2016 |

OTHER PUBLICATIONS

International Search Report and Written Opinion as issued by the International Searching Authority, dated Jun. 23, 2022, for International Patent Application No. PCT/EP2022/056763; 20 pages.

O'Brien et al., "A Radiation tolerant digital fluxgate magnetometer", Measurement Science and Technology, IOP, Bristol, GB, vol. 18, No. 11, Nov. 2007, pp. 3645-3650; 6 pages.

Chen Fang et al., "Dual-Resonator MEMS Magnetometer Based on Self-Clocking Sigma-Delta Modulation", IEEE Sensors Journal, IEEE Service Center, New York, vol. 20, No. 3, Oct. 12, 2019, pp. 1527-1535; 9 pages.

Sousa F. et al., "Taking advantage of LVDS input buffers to implement sigma-delta A/D converters in FPGAs", Proceedings / 2004 IEEE International Symposium on Circuits and Systems, May 23-26, 2004, Sheraton Vancouver Wall Centre Hotel, Canada, May 23, 2004, pp. I-1088; 4 pages.

Seifert E. et al., "Enhancing the dynamic range of analog-to-digital converters by reducing excess noise", Communications, Computers and Signal Processing, 1989, Conference Proceeding, IEEE Practice Rim Conference On, IEEE, Jun. 1989, pp. 574-576; 3 pages.

* cited by examiner

FLUXGATE CURRENT TRANSDUCER

CROSS-REFERENCE TO RELATED APPLICATIONS

The present application is a national stage entry of International (PCT) Patent Application Number PCT/EP2022/056763, filed Mar. 15, 2022, which claims priority to European Patent Application Number 21164001.6, filed Mar. 22, 2021, the complete disclosures of which are expressly incorporated herein by reference.

The present invention relates to a current transducer with a fluxgate detector, in particular a closed loop current transducer with fluxgate detector.

Fluxgate current transducers are well known and used in many current sensing applications. A fluxgate current transducer typically comprises a magnetic field detector having a saturable soft magnetic core 4 surrounded by an excitation coil 6. In many fluxgate transducers, a primary conductor carrying a current to be measured extends through the central passage of the magnetic field detector. In closed-loop transducers, there is a compensation coil magnetically coupled to the magnetic field detector and connected in a feedback circuit to a signal processing circuit, the compensation coil seeking to cancel the magnetic field generated by the primary conductor. Such an arrangement is well known. It is also possible to use the fluxgate in an open-loop manner whereby there is no compensation coil and only a primary conductor carrying the current to be measured. In view of the high sensitivity of fluxgate magnetic field detectors, they are however mainly used in a closed-loop configuration.

A closed loop current transducer with fluxgate detector is described in U.S. Ser. No. 10/126,332. A current transducer with fluxgate detector as described in the aforementioned patent advantageously provides for very accurate measurement of currents or differential currents flowing in one or more primary conductors extending through a central region of the transducer surrounded by the magnetic circuit core. Fluxgate detectors have a high sensitivity and low offset compared to the widely used Hall effect detectors. The electronics required to drive the excitation current for saturation of the magnetic core of the fluxgate detector as well as for driving the compensation current and any ripple compensation current, render such a current transducer more costly and less compact than conventional open loop current transducers with Hall effect detectors.

Typically, in a current transducer of the aforementioned fluxgate type, a microcontroller (digital signal processor DSP) with two cores is typically needed to guarantee sufficiently high performance, one core being used to excite the fluxgate continuously and obtain fluxgate current information in real time, and the other core used to supervise, communicate and perform calculations. The microcontroller who also typically has a 16 bit differential analog-to-digital ADC converter and generates a high resolution pulse width modulation (PWM) signal that works for instance at 10 megahertz. The cost of such a DSP is however quite high and typically requires implementation on a circuit board of a certain size that exceeds what would be strictly required for dedicated use in signal processing functions required by a current transducer with fluxgate detector.

It is an object of this invention to provide a current transducer with fluxgate detector that is very accurate, yet that is cost effective to manufacture and to implement.

It is advantageous to provide a current transducer with fluxgate detector that is easily adjusted or calibrated for user requirements.

It is advantageous to provide a current transducer that is very accurate, has low offset, is easy to implement and may be easy configured for different current measurement ranges in a cost effective and reliable manner.

It is advantageous to provide a fluxgate current transducer that is easy to install and operate.

Objects of the invention have been achieved by providing a fluxgate current transducer according to claim 1 and method of operating a fluxgate current transducer according to claim 7.

Disclosed herein is a fluxgate current transducer including a control circuit and a fluxgate measuring device comprising a fluxgate magnetic field detector, the fluxgate magnetic field detector comprising a saturable soft magnetic core surrounded by an excitation coil, the control circuit comprising an excitation coil drive circuit connected to the excitation coil and a controller connected to the excitation coil drive circuit configured to generate an alternating excitation current Ifx to alternatingly saturate the soft magnetic core, characterized in that the controller is in the form of a FPGA (Field Programmable Gate Array) comprising at least one input comprising a 1 bit sigma delta analog-to-digital converter (ADC) connected to the excitation coil to receive a measurement signal output by the excitation coil.

Said at least one input comprises a LVDS (low voltage differential signaling) or comparator input of the FPGA. It may be noted that an LVDS input may also act act as a comparator and that input circuits designated as comparators may also be used in the sigma delta (ΣΔ) modulator circuits of the present invention.

The FPGA comprises a plurality of inputs comprising each a 1 bit sigma delta analog-to-digital converter (ADC), the bit stream output signals of the plurality of 1 bit sigma delta analog-to-digital converters being added before being fed into a digital filter.

In an advantageous embodiment, the 1 bit sigma delta analog-to-digital converter (ADC) comprises a first resistor (R1) connected in series to a first input of the LVDS, a first capacitor (C1) connected between a reference potential and the first input, and a feedback loop from an output of the LVDS and the first input, the feedback loop comprising a 1 bit DAC and second resistor (R2).

In an advantageous embodiment, the FPGA comprises a 1 bit sigma delta digital-to-analog (DAC) output connected to the excitation coil via a RC filter to supply a voltage control signal that is fed into an amplifier of the excitation coil drive circuit to supply the excitation coil of the fluxgate detector with an alternating excitation current.

In an advantageous embodiment, the transducer further comprises a compensation coil and the control circuit comprises a compensation coil drive circuit to supply the compensation coil of the fluxgate measuring device with a compensation current Is seeking to cancel the magnetic field of the primary current Ip, the FPGA comprising a 1 bit sigma delta digital-to-analog (DAC) output connected to the compensation current coil via an RC filter to supply a voltage control signal to the compensation coil drive circuit.

In an advantageous embodiment, the current transducer further comprises a ripple cancellation coil and the control circuit comprises a ripple cancellation coil drive circuit to supply the compensation coil of the fluxgate measuring device with a compensation current Is seeking to cancel the magnetic field of the primary current Ip, the FPGA comprising a 1 bit sigma delta digital-to-analog (DAC) output connected to the ripple current cancellation coil via an RC filter to supply a voltage control signal to the ripple cancellation coil drive circuit.

In an advantageous embodiment, the FPGA comprises an excitation voltage control circuit portion configured to generate an excitation voltage control signal Ve for the excitation coil having a trapezoidal shaped waveform with rounded corners.

In an advantageous embodiment, the FPGA comprises a plurality of inputs comprising each a 1 bit sigma delta analog-to-digital converter (ADC), a 1 bit stream for each ADC being added before input to a digital filter.

In an advantageous embodiment, the preceding claims characterized in that the method includes generating an excitation signal for the excitation coil of the fluxgate magnetic field detector as a trapezoidal shaped waveform with rounded corners. One may view the excitation signal as a substantially rectangular wave with softened rising and falling edges to reduce noise. The method to soften the edges may include replacing the edges by a reduced harmonic waveform like the rising part of a sine wave In an advantageous embodiment, the trapezoidal waveform is generated using a fluxgate excitation lookup table stored in a memory of the FPGA.

Further objects and advantageous features of the invention will be apparent from the claims, from the detailed description, and annexed drawings, in which:

Figure 1:
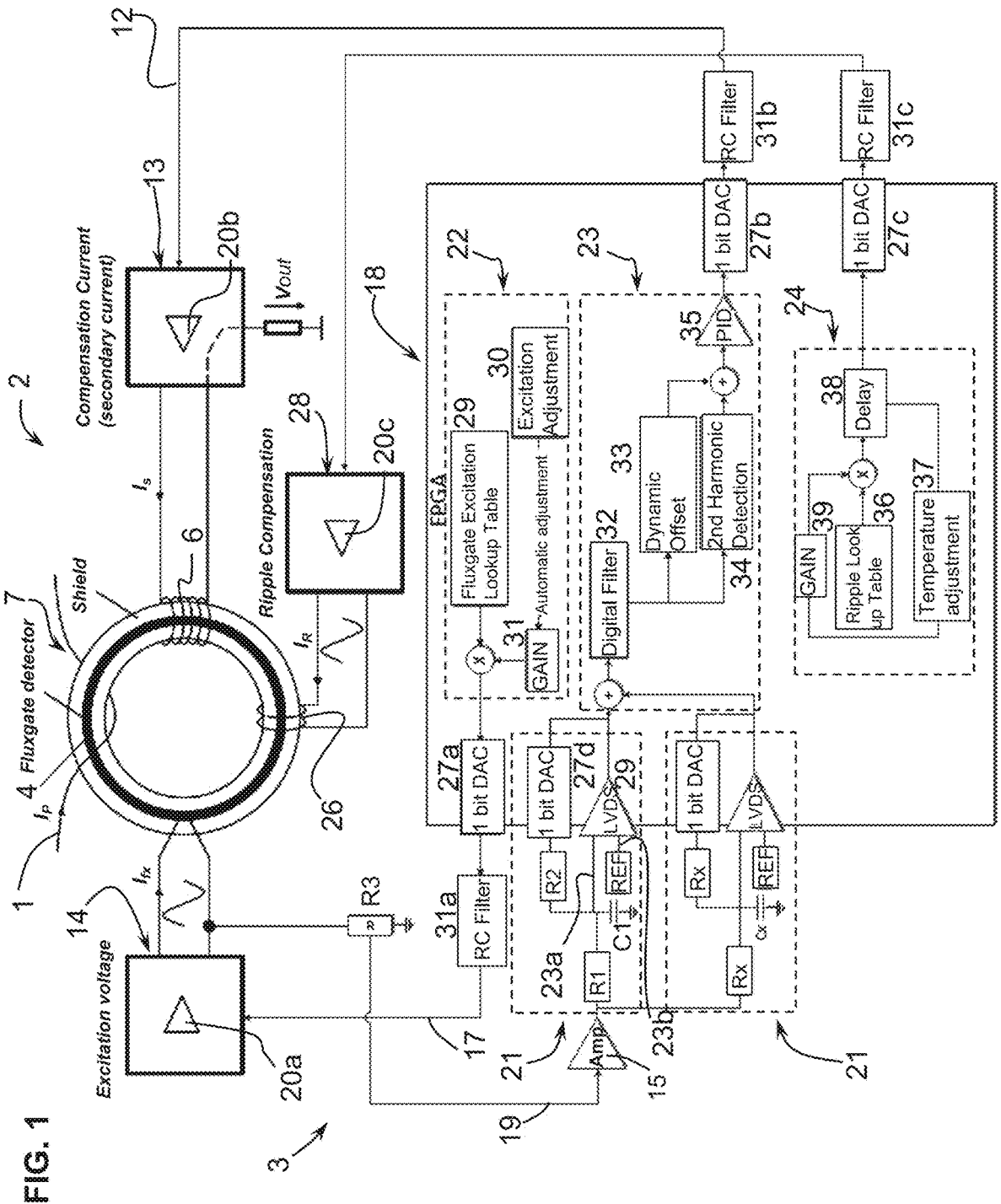
FIG. 1 is a schematic block diagram of a current transducer with fluxgate detector according to an embodiment of the mention.

Referring to FIG. 1, an electrical current transducer 2 for measuring a primary current $I_P$ flowing in a primary conductor 1 comprises a fluxgate measuring device 7 and a control circuit 3.

The fluxgate measuring device comprises a fluxgate magnetic field detector 4 and a secondary coil 6.

As is per se well known in the art, the secondary coil acts as a compensation coil that is supplied with electrical current $I_S$ in a feedback loop 12 connected to the fluxgate detector 4 that seeks to cancel the magnetic field generated by a primary conductor 1 carrying the current $I_P$ to be measured, the primary conductor extending through a central passage 10 of the transducer.

The fluxgate magnetic field detector 4 comprises a saturable soft magnetic core surrounded by an excitation coil that is connected to an excitation coil drive circuit 14 that generates an alternating excitation current $I_{fx}$ configured to alternatingly saturate the soft magnetic core.

The current transducer may further comprise a ripple compensation circuit 28 connected to a ripple compensation coil 26 to perform a ripple compensating function for instance as per se known from WO2016/016038.

The ripple compensation circuit 28 is configured to generate a ripple compensation current $I_R$ that seeks to cancel the ripple signal caused by the excitation current $I_{fx}$ of the fluxgate detector 4.

The excitation voltage signal $I_{fx}$ for the excitation coil of the fluxgate magnetic field detector 4 is generated by the control circuit 3, in particular the controller 18 connected to the excitation coil drive circuit 14 which comprises an amplifier 20 to amplify the excitation coil control signal 17 output by the controller 18.

According to a first aspect of the invention, the controller 18 is in the form of a FPGA (Field Programmable Gate Array) comprising at least one LVDS (low voltage differential signaling) input connected to the excitation coil.

The LVDS input forms part of a 1 bit sigma delta analog-to-digital converter (ADC) 21 connected to the excitation coil to receive a measurement signal 19 output by the excitation coil.

In the embodiment illustrated in FIG. 1, there are two LVDS inputs forming part of two 1 bit sigma delta analog-to-digital converters (ADC) 21 connected to the excitation coil, however the FPGA may comprise only one or more than two LVDS inputs connected to the excitation coil within the scope of the invention. Preferably the FPGA comprises more than two LVDS inputs connected to the excitation coil, for instance 6, 8, or more.

The 1 bit sigma delta analog-to-digital converter (ADC) 21 comprises a first resistor R1 connected in series to a first input 23 of the LVDS, a first capacitor C1 connected between a reference potential (e.g. ground) and the first input 23, and a feedback loop from an output 29 of the LVDS and the first input 23, the feedback loop comprising a 1 bit DAC 27d and second resistor R2. A second input of the LVDS is connected to a reference voltage, for instance a mid-point of the FPGA LVDS bank may be used.

In the input line of the LVDS, the R1-C1 circuit components forms an integrator for the sigma delta conversion, and the amplifier 15 serves to adjust the voltage to the LVDS input and act as a low impedance output and allow the sigma delta conversion to work properly.

Basically, the ADCs 21 comprise an oversampling modulator followed by a digital/decimation filter that together produce a high-resolution data-stream output. The R1-C1 and Rx-Cx circuit components act as integrators and the LVDS inputs act as comparators. The clock frequency of the system (for instance a frequency >100 MHz) will then generate a 1 bit stream for each ADC 21 that are added before the digital filter 32. Adding a plurality of 1 bit sigma delta converters 21 increases the resolution of the bit stream and reduces noise.

Advantageously, the 1 bit sigma delta analog-to-digital converter (ADC) 21 configured using a LVDS input of the FPGA is very cost effective to implement yet allows high precision due to the high frequency operational capability of a FPGA LVDS, typically greater than 100 MHz, and the digital signal processing of the subsequent measurement signal output by the LVDS. Moreover the 1 bit sigma delta analog-to-digital converter (ADC) 21 configured using a LVDS input 29 of the FPGA exhibits little or no drift and stable measurement accuracy over a typical operating temperature range for fluxgate current transducers.

Another important advantage of the FPGA is that it starts very rapidly, typically in less than 500 ms, compared to a DSP which needs about 8 seconds.

The FPGA may advantageously further comprise a 1 bit sigma delta digital-to-analog (DAC) output 27a connected to the excitation coil via a low pass RC filter 31a to supply a voltage control signal that is fed into the amplifier 20 of the excitation coil drive circuit 14 to supply the excitation coil of the fluxgate detector with an alternating excitation current. The FPGA advantageously allows high frequency 1 bit DAC that can be filtered only using first order low pass filters with simple RC circuit components, whereby no active filter is needed.

The fluxgate Excitation LUT (Lookup table) is a table of N points defined that is read at a dedicated frequency to generate the fluxgate excitation signal. Each output value of this table can be adjusted dynamically by a gain circuit 31 and compensated in temperature or other parameters such as magnetic material fluctuations by an excitation adjustment circuit portion 30.

In a variant (not shown), the FPGA may comprise two 1 bit sigma delta digital-to-analog (DAC) outputs 27a to generate a differential output DAC to the excitation coil via low pass RC filters 31a to supply a voltage control signal that is fed into the amplifier 20 of the excitation coil drive circuit 14 to supply the excitation coil of the fluxgate detector with an alternating excitation current.

The FPGA may advantageously further comprise a 1 bit sigma delta digital-to-analog (DAC) output 27b connected to the compensation current coil via a low pass RC filter to supply a voltage control signal that is fed into the amplifier 20b of the compensation coil drive circuit 13 to supply the compensation coil of the transducer device 7 with a compensation current Is seeking to cancel the magnetic field of the primary current Ip. ADC inputs are fed into a digital filter 32 to digitalize the fluxgate current thanks to a CIC filter (Cascaded-Integrator-Comb-Filter) and a decimation filter. Then the digitalized fluxgate current is processed to evaluate with a simple calculation the even harmonics of the fluxgate current which should be compensated to perform the regulation.

In a variant (not shown), the FPGA may comprise two 1 bit sigma delta digital-to-analog (DAC) outputs 27b to generate a differential output DAC connected to the compensation current coil via low pass RC filters to supply a voltage control signal that is fed into the amplifier 20b of the compensation coil drive circuit 13.

The FPGA may advantageously further comprise a 1 bit sigma delta digital-to-analog (DAC) output 27c connected to the ripple current cancellation coil 26 via a low pass RC filter 31c to supply a voltage control signal that is fed into the amplifier 20c of the ripple coil drive circuit 28 to supply the ripple current cancellation coil 26 of the transducer device 7 with a ripple coil cancellation current Ir.

In a variant (not shown), the FPGA may comprise two 1 bit sigma delta digital-to-analog (DAC) outputs 27c to generate a differential output DAC connected to the ripple current cancellation coil 26 via low pass RC filter 31c to supply a voltage control signal that is fed into the amplifier 20c of the ripple coil drive circuit 28.

The ripple signal generation uses a similar block as described in relation with the excitation signal generation. There is a lookup table that is read at a specific frequency by the FPGA. The output can be adjusted dynamically with a gain circuit portion 39 and compensated in temperature by a temperature adjustment circuit portion 37. To be able to compensate the transducer noise some delay is added by a delay circuit portion 38 to this ripple compensation to compensate the noise properly.

Figure 2B:
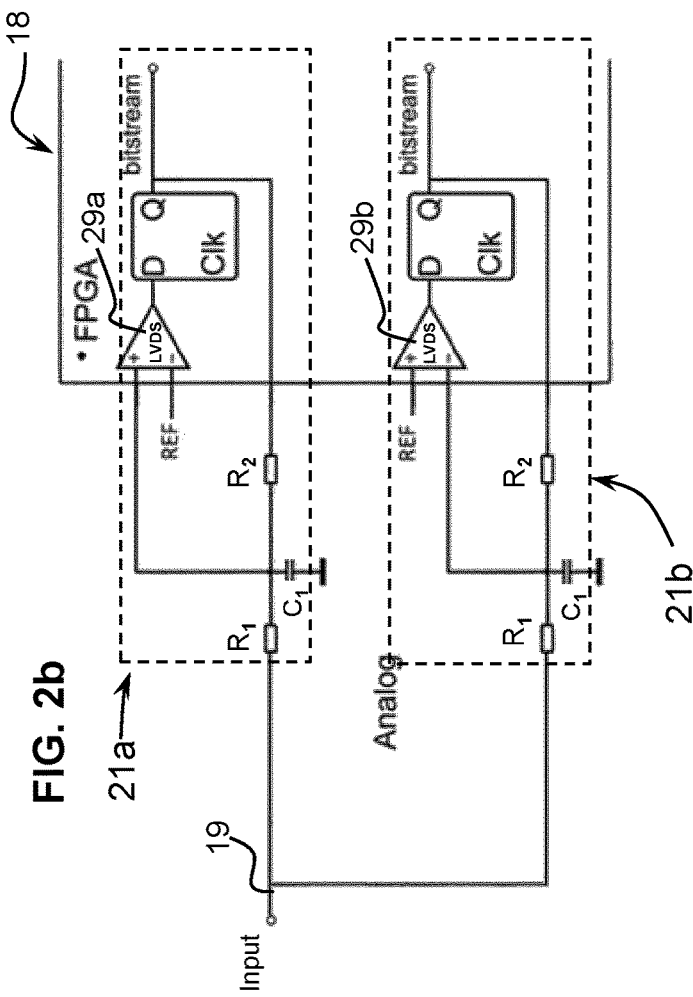
FIG. 2b is a figure similar to FIG. 2a of a variant.
Figure 2A:
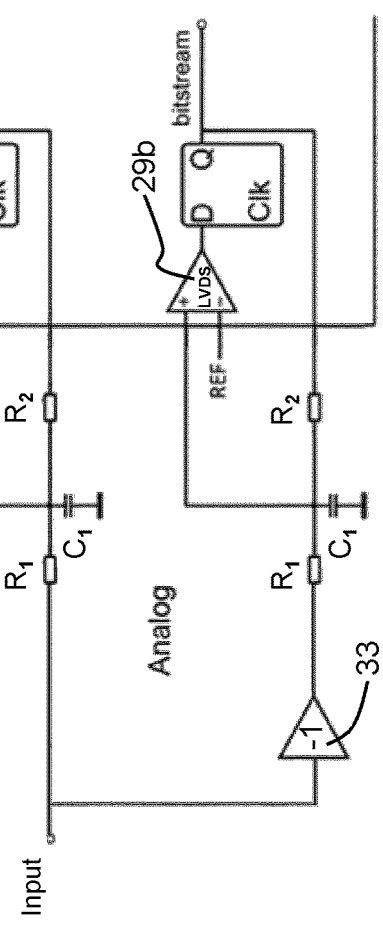
FIG. 2a is a schematic circuit diagram of a portion of an input circuit to a Field Programmable Gate Array (FPGA) of a transducer control circuit according to an embodiment of the invention.

FIGS. 2a and 2b shows another embodiment of the invention using the 1 bit sigma delta ADC in pseudo differential mode to improve resolution and noise. In FIG. 2b, the LVDS input 21b is shifted to get the opposite bitstream of the LVDS input 21a. In FIG. 2a, an inverting amplifier 33 is used to avoid inverting the LVDS input to generate the pseudo differential mode.

Figure 2C:
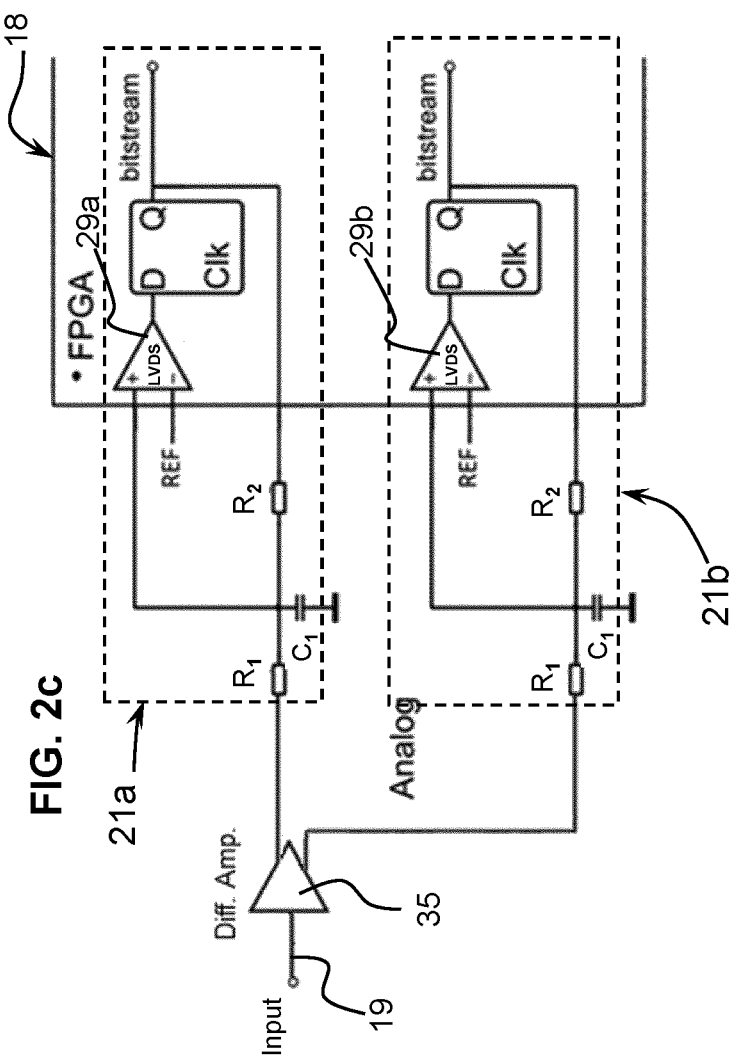
FIG. 2c is a figure similar to FIG. 2b of yet another a variant.

In FIG. 2C we use a differential amplifier 35 comprising two outputs used to generate the pseudo differential mode.

Figure 3A:
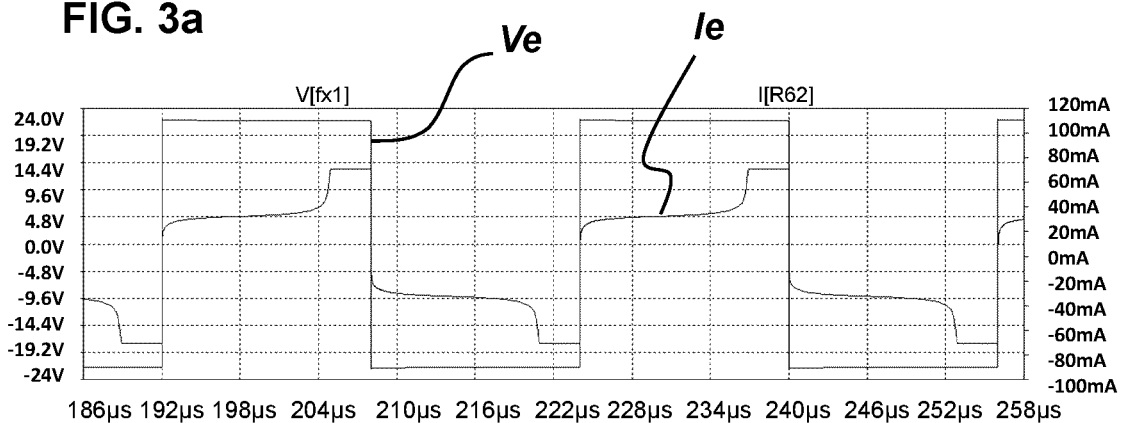
FIG. 3a is a schematic graphical representation of plots of a sinusoidal excitation voltage and associated excitation current of an excitation coil driver according to the prior art.
Figure 3B:
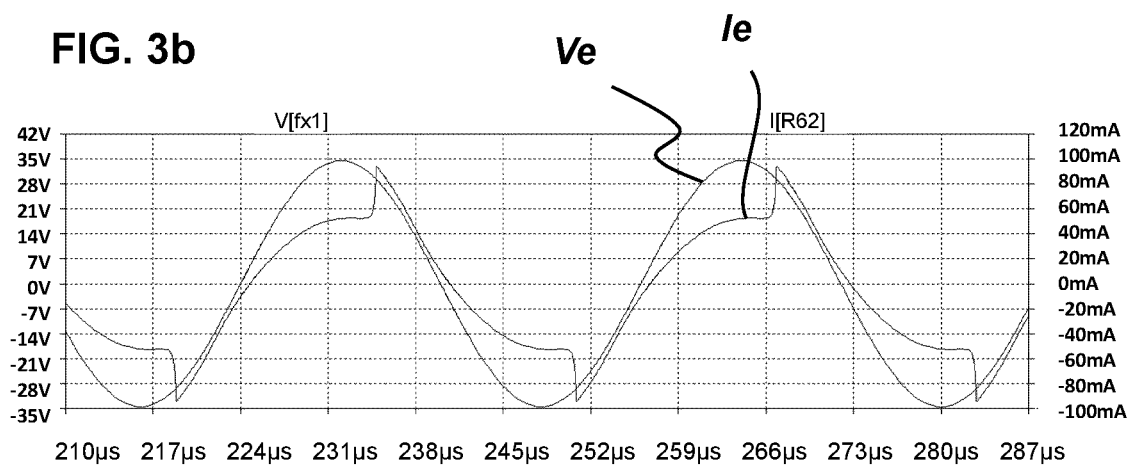
FIG. 3b is a schematic graphical representation of plots of a square excitation voltage and associated excitation current of an excitation coil driver according to the prior art.
Figure 4:
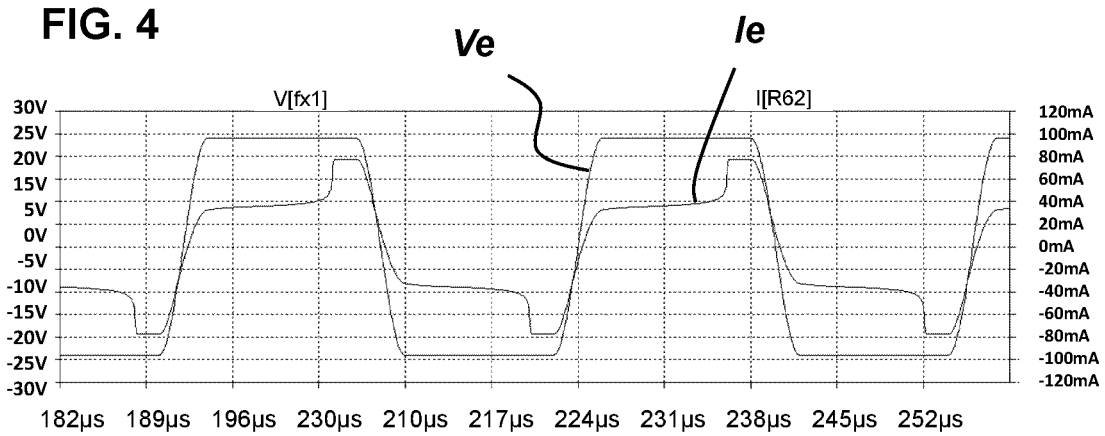
FIG. 4 is a schematic graphical representation of plots of a hybrid excitation voltage according to an embodiment of the invention and associated excitation current signal.

According to a second aspect of the invention, the shape of the excitation voltage signal for the excitation coil of the fluxgate magnetic field detector is provided as a trapezoidal shaped waveform Ve with rounded corners (FIG. 4). The aim is to reduce the high frequency content of the excitation current signal Ie compared to a voltage signal square wave (FIG. 3a), while obtaining a higher mean value of a signal half cycle compared to a sinusoidal signal of same peak value (FIG. 3b). This allows to saturate the fluxgate core using a lower peak voltage than would be required using a sinusoidal signal without however the drawbacks of using a square voltage that generates high frequency noise that adversely affects the output measurement signal. The FPGA comprises an excitation voltage control circuit portion 22 configured to generate an excitation voltage control signal for the excitation coil having a trapezoidal shaped waveform with rounded corners. The trapezoidal shaped waveform may be generated using a fluxgate excitation lookup table 29 stored in a memory of the FPGA or externally with an EPROM or flash memory.

LIST OF FEATURES primary conductor 1
electrical current transducer 2
fluxgate measuring device 7
fluxgate magnetic field detector 4
   saturable soft magnetic core
   excitation coil
secondary coil 6
ripple compensation coil 26
control circuit 3
feedback loop 12
compensation current drive circuit 13
excitation coil drive circuit 14
amplifier 20
ripple compensation circuit 28
FPGA controller 18
1 bit sigma delta analog-to-digital converter (ADC) 21
LVDS input 29a
1 bit sigma delta digital-to-analog (DAC) outputs 27a, 27b, 27c, 27d
RC filter 31a, 31b, 31c
primary current $I_P$
secondary current $I_S$
alternating excitation current $I_{fx}$
ripple cancellation current $I_R$

The invention claimed is:

1. A fluxgate current transducer including a control circuit and a fluxgate measuring device comprising a fluxgate magnetic field detector, the fluxgate magnetic field detector comprising a saturable soft magnetic core surrounded by an excitation coil, the control circuit comprising an excitation coil drive circuit connected to the excitation coil and a controller connected to the excitation coil drive circuit configured to generate an alternating excitation current $I_{fx}$ to alternatingly saturate the soft magnetic core, wherein the controller is in the form of a FPGA (Field Programmable Gate Array) comprising a plurality of input circuit portions, each comprising a 1 bit sigma delta analog-to-digital converter (ADC) connected to the excitation coil to receive a measurement signal output by the excitation coil, each input circuit portion comprising a LVDS (low voltage differential signaling) comparator input of the FPGA, wherein bit stream output signals of said 1 bit sigma delta analog-to-digital converters are added before being fed into a digital filter.

2. The fluxgate current transducer according to claim 1, wherein the 1 bit sigma delta analog-to-digital converter (ADC) comprises a first resistor (R1) connected in series to a first input of the LVDS, a first capacitor (C1) connected between a reference potential and the first input, and a feedback loop from an output of the LVDS and the first input, the feedback loop comprising a 1 bit DAC and second resistor (R2).

3. The fluxgate current transducer according to claim 1, wherein the FPGA comprises a 1 bit sigma delta digital-to-analog (DAC) output connected to the excitation coil via a RC filter to supply a voltage control signal that is fed into an amplifier of the excitation coil drive circuit to supply the excitation coil of the fluxgate detector with an alternating excitation current.

4. The fluxgate current transducer according to claim 1, further comprising a compensation coil and the control circuit comprises a compensation coil drive circuit to supply the compensation coil of the fluxgate measuring device with a compensation current Is seeking to cancel the magnetic field of a primary current Ip, the FPGA comprising a 1 bit sigma delta digital-to-analog (DAC) output connected to the compensation current coil via an RC filter to supply a voltage control signal to the compensation coil drive circuit.

5. The fluxgate current transducer according to claim 1, further comprising a ripple cancellation coil and the control circuit comprises a ripple cancellation coil drive circuit to supply the compensation coil of the fluxgate measuring device with a compensation current Is seeking to cancel the magnetic field of a primary current Ip, the FPGA comprising a 1 bit sigma delta digital-to-analog (DAC) output connected to the ripple current cancellation coil via an RC filter to supply a voltage control signal to the ripple cancellation coil drive circuit.

6. The fluxgate current transducer according to claim 1, wherein the FPGA comprises an excitation voltage control circuit portion configured to generate an excitation voltage control signal Ve for the excitation coil having a trapezoidal shaped waveform.

7. A method of operating a fluxgate current transducer according to claim 1, wherein the method includes generating an excitation signal for the excitation coil of the fluxgate magnetic field detector as a trapezoidal shaped waveform.

8. The method according to claim 7, wherein the trapezoidal shaped waveform is generated using a fluxgate excitation lookup table stored in a memory of the FPGA.

* * * * *